Patented July 30, 1929.

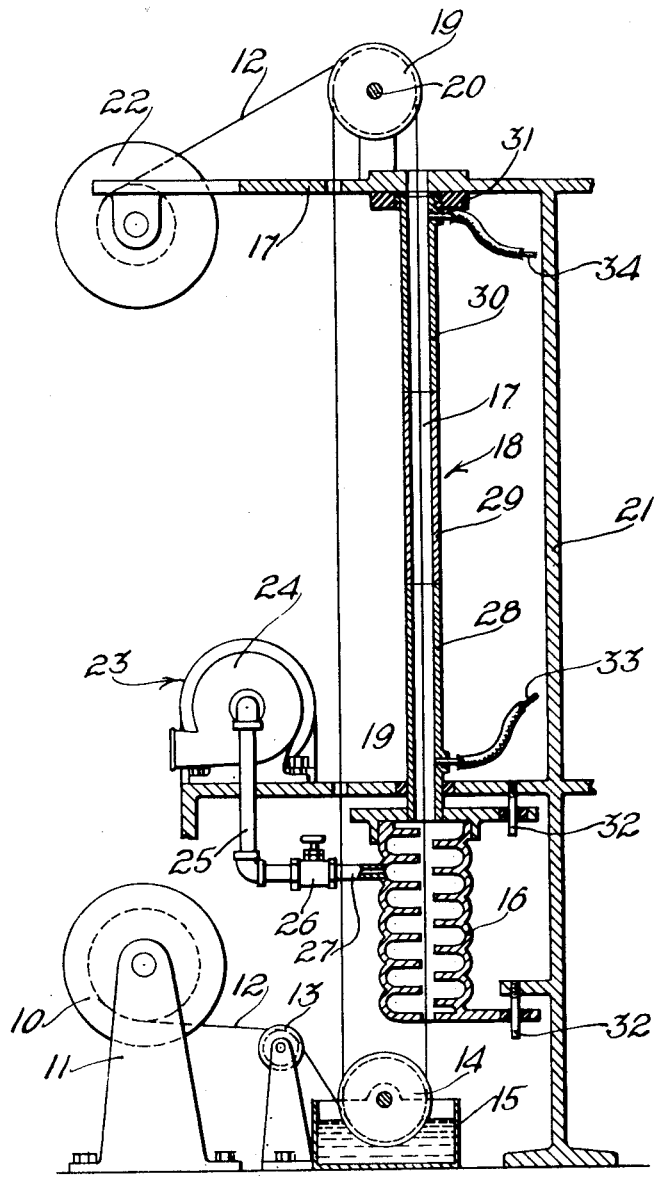

1,722,797

UNITED STATES PATENT OFFICE.

RICHARD DALE JESSUP, OF LA GRANGE, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR APPLYING AND BAKING AN INSULATING ENAMEL COATING.

Application filed November 10, 1925. Serial No. 68,246.

This invention relates to a method of and apparatus for applying and baking an insulating enamel coating upon an electrical conductor.

The objects of this invention are to provide a simple, inexpensive and efficient method of and apparatus for coating wire, wherein the heat applied to the baking chamber and the flow of air therethrough are so regulated as to provide effective baking conditions substantially throughout the chamber.

In order to obtain these objects in accordance with the general features of this invention, there is provided a suction mechanism designed for application to the lower portion of a wire baking oven or chamber. Types of wire coating machines now in common use provide for the application of insulating enamel to the wire by feeding the wire through a bath of enamel. The wire thus coated is fed upwardly through a muffle and thence through an upright tube wherein the enamel, adhering to the wire, is baked. The suction mechanism above mentioned is applied to the muffle and is designed to reduce and adjustably control the flow of air from the muffle into the heating chamber. The heating chamber is confined within a tubular casing which serves as an electrical heating element and is designed to impart varied degrees of heat throughout the chamber, with the result that the heating or baking range of the oven is effectively increased. It is to be understood that the retarding effect produced by the suction mechanism, in cooperation with the operating characteristics of the means for heating the air in the chamber, will result in decidedly increasing the operating efficiency of the machine.

These and other objects will appear from the following description and the accompanying drawing illustrating one embodiment of the invention, in which is shown a fragmentary side elevational view, partially in section, of a machine disclosing an embodiment of this invention.

Referring to the drawing, in which like numerals designate similar parts throughout the disclosure, a wire supply spool 10 is rotatably mounted in a floor bracket or standard 11. A wire 12 is guided from the spool 10 by an idler 13 to a rotatable sheave 14, partially immersed in a bath of coating compound such as an insulating enamel within a container 15. The wire 12 and the compound adhering thereto is thence directed upwardly through an opening in the bottom of a muffle 16 of conventional design. The wire 12 passes upwardly through the muffle 16 and extends into an upright, elongated baking chamber 17. The baking chamber 17 having communication with the outer air at its lower end through the muffle 16, is formed within a tubular casing, denoted generally by the numeral 18. After passing through the chamber 17, the wire 12 is directed through the upper, open end thereof to a sheave 19 revolvable on a spindle 20 suitably mounted in the upper part of the machine frame 21. The wire is then fed downwardly from this sheave 19 to a sheave (not shown) companion to and in alignment with the sheave 14 and then upwardly again to a sheave (not shown) similarly associated with the sheave 19. The number of sheaves employed will depend upon the number of times it is desired to pass the wire through the coating compound and baking chamber 17. Having passed through the chamber 17 the desired number of times, the wire is then directed to a receiving spool 22 which is equipped with a suitable power take-up device (not shown), the speed of which may be regulated to the speed at which it is desired to feed the wire 12 through the baking chamber 17.

A suction mechanism being generally referred to by the numeral 23, includes a motor driven suction pump 24 mounted upon the machine frame. This pump 24 communicates with the interior of the muffle 16 through the medium of a pipe line 25, a regulating valve 26, and a flexible rubber conduit 27, said mechanism being designed to withdraw air from the upper portion of the muffle. The valve 26 serves to control the rate at which air is thus withdrawn from the muffle 16. Referring now to the baking chamber 17 within the tubular casing 18, it will be observed that this casing 18 comprises three sections of metallic tubing 28, 29 and 30 welded together so that sections 28 and 30 form the lower and upper portions thereof, respectively. The casing 18 is mounted at its upper end and electrically insulated from the machine frame in a block 31. The lower end of the casing 18 supports the muffle 16, said muffle being slidably mounted upon and insulated from guide pins 32, secured to the machine frame 21. By this construction the casing 18 is free to expand when heated. By means of conductors 33 and 34 connected with the lower and upper ends, respectively, of the casing 18, the sections 28, 29 and 30 are connected in series with a source of electric current supply (not shown). Heat occasioned by the flow of current through these sections supplies the means for heating the air within the chamber 17 and thus it will be clear that the sections serve both as tubular casings and heating elements.

The lowermost section 28 is constructed of high resistance material and the flow of current therethrough generates a relatively large amount of heat. The section 29, however, is constructed of metallic material which affords less resistance to the current flowing therethrough than the resistance in section 28, and as a result, the heat generated in the section 29 is relatively less. Likewise, the heat generated in the section 30 is less than the heat produced in the adjoining section 29, section 30 being of relatively less resistance than section 29. From the foregoing it will be clear that the air within the chamber 17 is subjected to its maximum heat within the section 28 in the lower portion of the chamber, to a medium heat in section 29, and to a relatively low heat in section 30. In this connection it will be noted that applicant's system of enamel baking distinguishes from certain heating or baking appliances now employed, wherein the heating elements used generate heat at a uniform rate throughout the entire length of the chamber. The air within the chamber subjected to uniformly applied heat in this manner, flows upwardly in the chamber, carrying the heat upwardly and resulting in high temperature in the upper portion of the chamber and low temperature in the lower portion. It may result in the lower part of the chamber being too cool to bake the wire enamel and the upper part too hot. By the arrangement of applicant's means for heating the air in the chamber 17, as described, the air therein is subjected to its maximum heat at the lower end of the chamber and as the air thus heated rises within the chamber 17, the heat distribution is equalized and the chamber is maintained at baking temperature throughout its entire length. It will be understood that additional sections may be used if desirable. The resistance of each section is in any case made such that the heat generated gives a uniform baking temperature to the air as it is carried upwardly in the chamber.

The suction mechanism 23 provides a very effective means for retarding the upward flow of the heated air within the chamber 17. Without some means for retarding the air flow within the chamber, much of the effectiveness of the air heated therein may be lost by reason of the fact that the upward flow of air is too rapid. This rapid upward movement would result in a corresponding ingress of cool air at the bottom of the chamber and a greater amount of electrical energy therefor required to maintain the effective range of heated air within the chamber. By adjusting the valve 26 of the suction mechanism 23 the upward flow of heated air within the chamber 17 and the ingress of cool air at the bottom thereof can be controlled so that only sufficient air passes through the chamber to oxidize the enamel and carry off the evaporated solvents into the exhaust. This is the condition of maximum efficiency.

Applicant has found that by concentrating the applied heat in the lower portion of the chamber 17 in preference to a uniform distribution of heat throughout its entire length, together with the adjustable suction means for retarding the upward flow of the heated air, wire can be fed through the machine at a rate of speed which is at least double the speed with which the wire is fed through machines now in common use. In practice, a plurality of these machines are grouped together with the suction and driving mechanisms functioning so as to contemporaneously serve each baking chamber.

Changes in the specific form of the invention, as herein described, may be made within the scope of what is claimed without departing from the spirit thereof.

What is claimed is:

1. In a wire coating apparatus, an elongated vertical chamber, means for drawing coated wire upwardly through the chamber and chamber heating means for heating the air in the chamber, said heating means being designed to impart its maximum degree of heat at the lower end portion of the chamber, and a minimum degree of heat at the upper end portion of the chamber.

2. In a wire coating apparatus, a heating chamber, means for drawing coated wire through the chamber, chamber heating means for heating the air in said chamber to bake the coating, and suction means for retarding the flow of air through the chamber.

3. In a wire coating apparatus an upright heating chamber, means for drawing coated wire through the chamber, chamber heating means for heating the air in said chamber said means being designed to impart its maximum degree of heat at the lower portion of the heating chamber, and suction means for retarding the flow of air through the chamber.

4. In a wire coating apparatus, a heating chamber confined within an electrical conductor tube of different sectionalized resistances designed for connection with a source of current supply, and means for drawing coated wire through the heating chamber.

5. In a wire coating apparatus an upright heating chamber confined within an electrical conductor tube of different sectionalized resistances designed for connection with a source of current supply, means for drawing coated wire through the heating chamber, and means for adjustably retarding the flow of air through the chamber.

6. In a wire coating apparatus, a heating chamber formed within a metallic tube comprising sections having different resistances, said sections being arranged in the order of their respective resistance values and designed for connection with a source of current supply, and means for drawing coated wire through the heating chamber.

7. In a wire coating apparatus, an upright heating chamber, means for drawing coated wire through the chamber, a muffle opening into the lower end of the chamber for causing an upward flow of air through the chamber, means for withdrawing air from the muffle to retard the upward flow of air through the chamber, and means for heating the air in the chamber.

8. In wire coating apparatus, a heating chamber, means for drawing coated wire through the chamber, means for heating the air in the chamber, means for maintaining a flow of heated air through the chamber, and means positioned at the point of entrance of air into the chamber to adjustably retard the flow of heated air therethrough.

9. The method of baking a wire coating, which consists in heating a zone of air so as to present maximum heat at the lower portion of the zone, causing an upward flow of heated air by permitting air to enter the lower end of the heated zone, adjusting the upward flow of the heated air by adjustably controlling the amount of air entering the heated zone, and passing a coated wire upwardly through the zone.

10. The method of baking a wire coating, which consists in heating a zone of air so as to present maximum heat at the lower portion of the zone and cause a normal upward flow of the heated air, retarding the normal upward flow of the heated air, and passing a coated wire upwardly through the zone.

11. In a wire coating mechanism, a vertical heating chamber through which the air normally flows upwardly, means for heating the air in said chamber, and means for reducing the atmospheric pressure at the lower end of the chamber to retard the upward flow of the heated air.

12. In a wire coating apparatus, a heating chamber, means for drawing coated wire through the chamber, means for heating the air in said chamber, means for causing the heated air to flow in the direction of the moving wire, and means for adjustably retarding the flow of the heated air.

In witness whereof, I hereunto subscribe my name this 29th day of October A. D., 1925.

RICHARD DALE JESSUP.